United States Patent
Ballantyne et al.

(10) Patent No.: US 7,184,745 B2
(45) Date of Patent: Feb. 27, 2007

(54) WIRELESS RECEIVER OPERATION

(75) Inventors: Wayne Wiggins Ballantyne, Coconut Creek, FL (US); Carlos Antonio Miranda-Knapp, Miramar, FL (US); Jeff Scott Markwell, Sunrise, FL (US)

(73) Assignee: Motorola, Inc., Schaumburg, IL (US)

( * ) Notice: Subject to any disclaimer, the term of this patent is extended or adjusted under 35 U.S.C. 154(b) by 37 days.

(21) Appl. No.: 10/356,901

(22) Filed: Feb. 3, 2003

(65) Prior Publication Data
US 2004/0176127 A1   Sep. 9, 2004

(51) Int. Cl.
    *H04M 11/04*   (2006.01)
(52) U.S. Cl. .................. 455/404.2; 455/456.1
(58) Field of Classification Search .......... 455/9, 455/11.1, 403, 404.2, 550.1, 95, 552.1, 456.1, 455/457, 256; 342/357.15, 357.02, 357.06, 342/357.12, 358
See application file for complete search history.

(56) References Cited

U.S. PATENT DOCUMENTS

| | | | |
|---|---|---|---|
| 5,650,770 A | 7/1997 | Schlager et al. | |
| 5,652,592 A | 7/1997 | Sanderford et al. | |
| 5,854,605 A * | 12/1998 | Gildea | 342/357.03 |
| 5,864,315 A * | 1/1999 | Welles et al. | 342/357.12 |
| 5,963,130 A | 10/1999 | Schlager et al. | |
| 6,108,545 A | 8/2000 | Keshavachar | |
| 6,314,308 B1 * | 11/2001 | Sheynblat et al. | 455/574 |
| 6,483,457 B2 * | 11/2002 | Hirata et al. | 342/357.12 |
| 6,501,420 B2 * | 12/2002 | Townsend et al. | 342/357.1 |
| 6,662,107 B2 * | 12/2003 | Gronemeyer | 701/213 |
| 6,696,982 B2 * | 2/2004 | Yoshioka et al. | 340/988 |
| 6,778,136 B2 * | 8/2004 | Gronemeyer | 342/357.15 |
| 6,928,275 B1 * | 8/2005 | Patrick et al. | 455/256 |
| 2004/0180668 A1 * | 9/2004 | Owens et al. | 455/456.1 |

* cited by examiner

Primary Examiner—CongVan Tran (57) ABSTRACT

A method and apparatus that monitors at least one environmental characteristic associated with a location of a wireless signal receiver (102). A determination is then made as to whether the wireless signal receiver (102) is likely to receive a wirelessly transmitted signal at its location. The determination is based at least in part upon the monitored at least one environmental characteristic that is associated with the location of the wireless signal receiver (102). The performance of the wireless signal receiver (102) is then improved based upon determining if the wireless signal receiver (102) is likely to receive a wirelessly transmitted signal.

17 Claims, 9 Drawing Sheets

| LOCATION | INDOORS | | OUTDOORS | |
|---|---|---|---|---|
| TIME OF DAY | DAY | NIGHT | DAY | NIGHT |
| TEMPERATURE | CONTROLLED TO "ROOM" TEMPERATURE. | CONTROLLED TO "ROOM" TEMPERATURE. | VARIES BY SEASON, BUT WARMER THAN DURING THE NIGHT. | VARIES BY SEASON, BUT COOLER THAN DURING THE DAY |
| LUMINOSITY | VARIES, BUT TYPICALLY BRIGHT. | VARIES | BRIGHT | DARK |
| RSSI | WEAK | WEAK | STRONG | STRONG |

WIRELESS RECEIVER OPERATION

TECHNICAL FIELD

The present invention is directed to a geo-positioning apparatus and method and more particularly to a method and system to improve the geo-positioning system operation.

BACKGROUND OF THE INVENTION

The availability of a satellite based Global Positioning System (GPS) has revolutionized geo-positioning and created new applications and/or commercially practical devices that incorporate geo-positioning into their operations. Examples of uses for automated geo-positioning that have been recently created or greatly expanded include moving map displays for use in automobiles and tracking of cargo shipments moving by truck, rail or other modes. Recent interest in using geo-positioning capabilities in cellular phones arose as a means to include geo-position with cellular phone calls, such as for the Enhanced 911, or E911, service mandated by the Federal Communications Commission (FCC) for locating cellular phones during a 911 call.

Wireless radio receivers, such as GPS receivers, are increasingly being included in portable, battery powered devices. Such portable devices, which include cellular phones, place energy consumption at a premium and strive to minimize energy consumption. Modern cellular phone communications protocols allow cellular receivers to operate with low power consumption by the portable cellular phones using those protocols. The GPS signal protocol, however, does not include features that facilitate lowering energy consumption in a receiver.

GPS radio signals are relatively low power signals transmitted at high RF frequencies. These characteristics result in great difficulty in receiving these signals in some areas, such as indoors or in sheltered areas. Portable GPS receivers are operated continuously or with a constant periodicity at times when no GPS signal is able to be received by the receiver so that the GPS signal can again be received and processed when the GPS receiver is relocated to a location where the GPS signal can be received. This causes the receivers to consume energy even when the probability of successful operation is low. This wastes energy, which is at a premium in portable devices.

Thus, there is a need for solving the problems with the prior art as described above, and in particular for an improved method for operating wireless receivers, such as GPS receivers, so as to improve power consumption and improve successful reception performance.

DETAILED DESCRIPTION

An exemplary embodiment of the present invention is incorporated in a handheld radio communications device that is primarily used for voice and data communications via a wireless terrestrial link. This handheld radio communications device includes a GPS receiver and also has a second wireless signal receiver to perform voice and/or data communications. These devices are typically powered by relatively small batteries and power consumption by the device is at a premium. The operation of these GPS receivers can therefore be improved by minimizing the operation of the GPS receiver when it is unlikely to receive a GPS signal. The benefits of the present invention, however, are applicable to other applications that incorporate wireless signal receivers.

Figure 1:
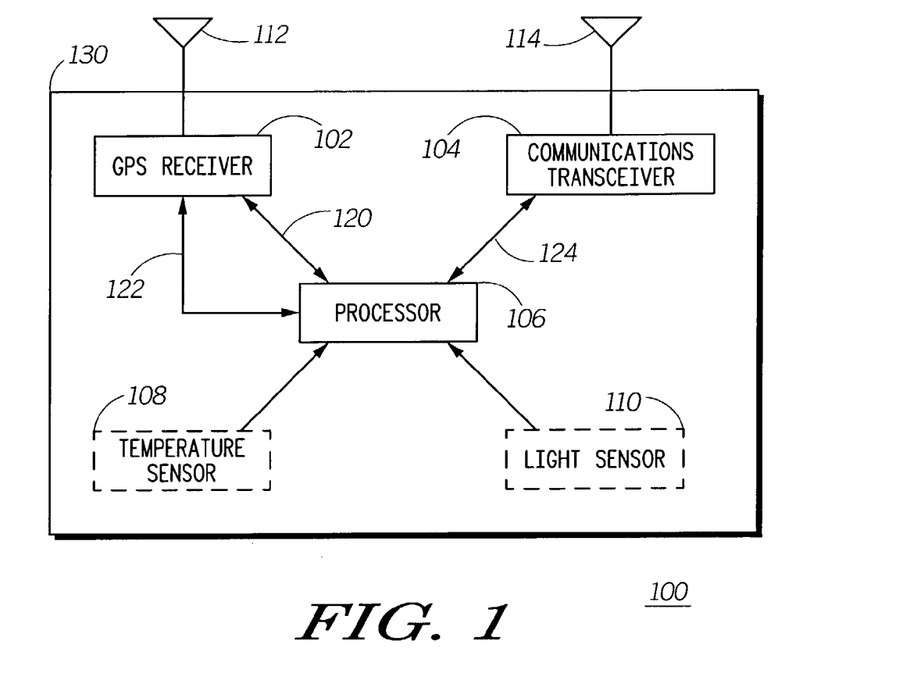
FIG. 1 is a block diagram of a handheld cell phone according to an exemplary embodiment of the present invention.

An exemplary handheld device block diagram 100 is illustrated in FIG. 1. An exemplary handheld communications device 130 has an external GPS antenna 112 and an external communications antenna 114. Alternative handheld devices use different antenna arrangements, including arrangements that combine the communications antenna 114 and GPS antenna 112 into a single antenna structure that is able to be located either in an internal or external location relative to the handheld device 130. The GPS antenna 112 in the exemplary embodiment is electrically connected to a GPS receiver 102 that is incorporated into the handheld device 130. The communications antenna 114 in the exemplary embodiment is electrically connected to the communications transceiver 104, which is a second wireless signal receiver that is also incorporated into the handheld device 130.

The GPS receiver 102 is a wireless signal receiver that is a geo-positioning receiver which is able to determine the location of the exemplary handheld communications device 130. The GPS receiver 102 of the exemplary embodiments includes a GPS receiver control interface 120 that allows the GPS receiver 102 to be commanded into different operational modes such as a fully operational mode, lower power standby operational modes and/or more fully powered down operational modes. The GPS receiver interface 120 of the exemplary embodiment is an RS-232. compliant serial data interface that is a dedicated communications link between the controller 106 and GPS receiver 102. Other embodiments utilize other data communications interfaces, such as RS-485, RS-422, parallel data communications interfaces and Ethernet interfaces. Placing the GPS receiver 102 of the exemplary embodiment into a lower power standby operational mode or a fully powered down operational mode inhibits a receiving function of the GPS receiver 102 and also lowers the power consumption of the GPS receiver 102. The GPS receiver 102 of the exemplary embodiments further allow control, by the GPS receiver control interface 120, of operating parameters of the GPS receiver 102 such as adjustment of sensitivity by adjustment of receiver tracking loop parameters. Control of receiver operating parameters allows balancing of receiver operating characteristics such as sensitivity and speed of signal acquisition. Operation of the GPS receiver 102 in an indoor environment, for example, may be attempted with narrow tracking loop bandwidths so as to improve operation with the expected lower signal to noise ratio of an indoor location but at the cost of longer signal acquisition times.

The GPS receiver 102 of the exemplary embodiment further has a GPS data interface 122 that supports the communications of data from and to the GPS receiver 102 such as bi-directional communications of location information, time information, satellite orbital data in either ephemeris or almanac form, and other operational data. The GPS data interface 122 is similarly an RS-232 compliant serial data interface in the exemplary embodiment. Other embodiments utilize a single GPS interface to perform all communications to and from the GPS receiver 102. Other embodiments further use other data communications interfaces, such as RS-485, parallel data communications interfaces and Ethernet interfaces. Data is provided to the GPS receiver 102, for example, to assist in initial start-up processing.

The handheld communications device 130 includes a controller 106 that performs the processing of the environmental monitor and the control of other components within the handheld device 130. The processing of controller 106 includes the processing of a GPS receiver controller that performs the processing to control the GPS receiver 102 through the GPS receiver control interface 120. The controller 106 of the exemplary embodiment is able to command an operational mode change of the GPS receiver 102 or to change operational parameters of the GPS receiver 102. The controller 106 receives geo-position information via the GPS data interface 122.

The controller 106 further performs processing to control the communications transceiver 104 via communications control interface 124. Controller 106 also receives status information from the GPS receiver 102 and communications transceiver 104. The status information received from the communications transceiver includes Received Signal Strength Indicator (RSSI) data produced by the communications transceiver 104 and reflects the strength of a second wirelessly transmitted signal, which is the strength of the communications signal that is received by communications transceiver 104 in the exemplary embodiment. The communications signal received by the communications transceiver 104 is a second wireless transmitted signal relative to the GPS signal since operation of the GPS receiver is sought to be improved by the present invention.

The controller 106 of the exemplary embodiment includes a real time clock that maintains the current time of day as well as the current day and month of the year. A preferred embodiment of the present invention sets the real time clock of the controller 106 from time of day information received from the GPS receiver 102, from information transmitted to and relayed by the communications transceiver 104 and/or by time and day information entered by a user. GPS operational information, such as time of day, location estimate and/or satellite orbital data, can be transmitted to the communications transceiver 104 in the exemplary embodiment by an external base system over a wireless communications link to the communications transceiver 104 and relayed to the controller 106 via control interface 124. Examples of GPS operational information include the location of the ground transmitter in communications with the communications transceiver 104, time of day and satellite orbital data. The geographic location of the ground transmitter in communications with the communications transceiver 104 can be used as an initial position estimate by the GPS receiver 102 during initial startup of the GPS receiver if a stored location estimate is not available in the GPS receiver 102 at startup.

The controller 106 of the exemplary embodiment is also configured to receive and maintain time of day, season of year and expected environmental data as is described below. In the exemplary embodiment, the environmental data include ambient temperature data, luminosity and signal strength data, as is described below. These data are pre-programmed into the memory maintained by the controller 106, as is described below, and are also able to be received by the communications transceiver 104 and passed to the controller 106 for storage so as to update or revise data currently stored in the memory of the controller 106.

Figure 12:
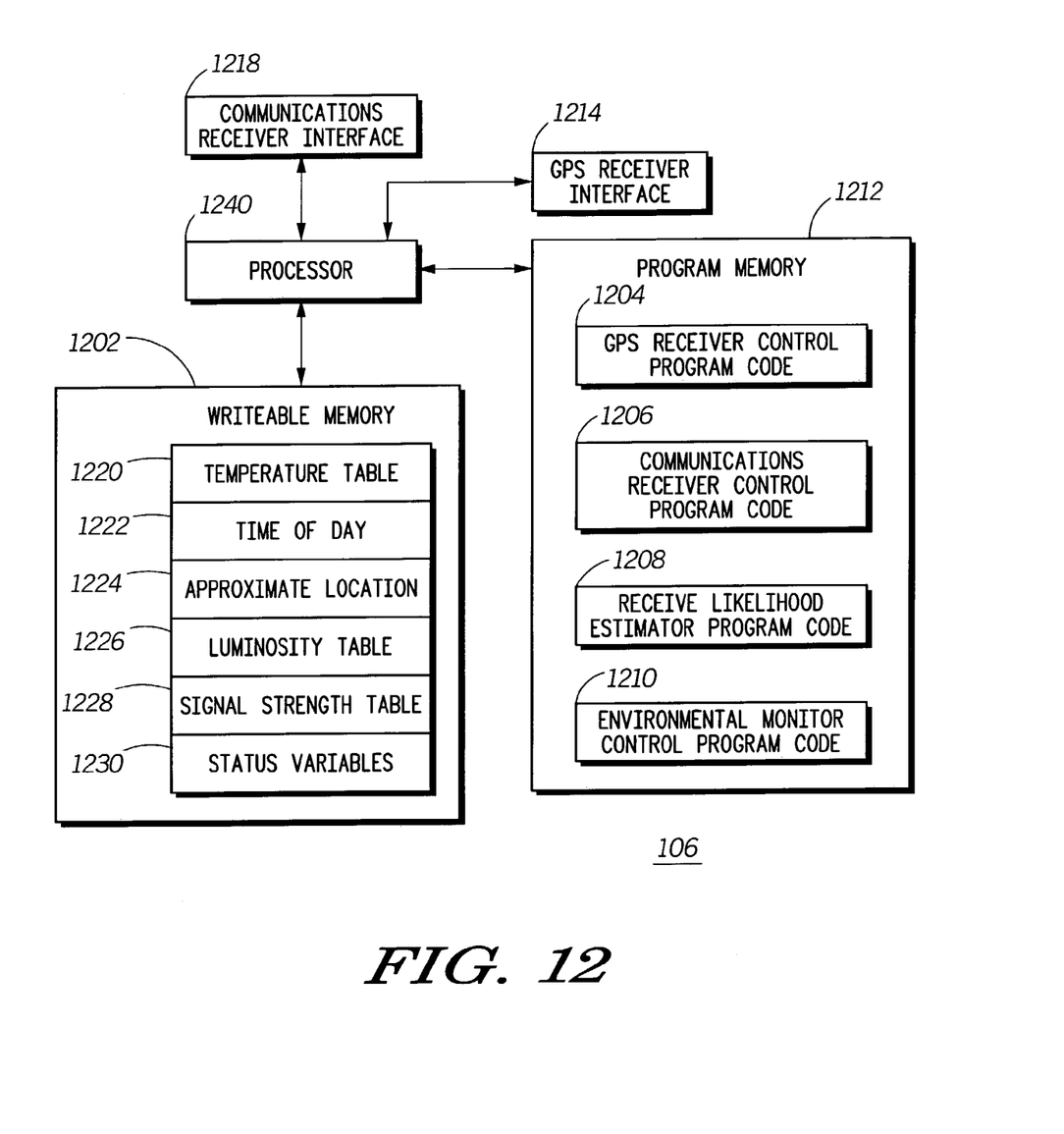
FIG. 12 is a block diagram of the controller used in the exemplary embodiment of the present invention that is shown in FIG. 1.

An exemplary controller 106 as used in the exemplary embodiment of the present invention is illustrated in FIG. 12. Exemplary controller 106 has a processor 1240 that performs data and communications processing as is required by the exemplary embodiment of the present invention. The processor 106 of the exemplary embodiment executes program code as is stored in a program memory 1212. The program memory of the exemplary embodiment allows downloading of new executable program data in order to support flexibility and updating of the processing of controller 106. Program memory 1212 of the exemplary embodiment contains program code components that contain instructions for the execution of various control functions of the exemplary embodiment. Program code components include the GPS receiver control program code 1204, the communications transceiver control program code 1206, the receive likelihood estimator program code 1208 and the environmental monitor control program code 1210. The exemplary embodiment utilizes a processor that executes program code components. Alternative embodiments include hardware controllers and other controller designs that are consistent with the teachings of the present invention.

Exemplary controller 106 further contains a writable memory 1202 into which programmable and/or changeable information is able to be stored. Writable memory 1202 in the exemplary embodiment is used to store information and data that may change more frequently than the data stored in program memory 1212. The operation of the exemplary embodiment in a particular environment or application may not require rewriting of data within the writable memory 1202, and program code and the usually more permanent data may change more frequently given a particular operational circumstance. The division of data among writeable memory 1202 and program memory 1212 is not important to the operation of the present invention and embodiments may not include one type of memory or divide data differently among the two types of memory.

Writable memory 1202 of the exemplary embodiment is used to store a temperature table 1220, a luminosity table 1226 and an expected signal strength table 1228. The use of data in these tables is described below. The writable memory further stores time of day 1222 and approximate location data 1224. The time of day 1222 includes day of year, month and year information in addition to time. The approximate location data 1224 contains the latest known location of the exemplary handheld communications device 130 for use as required. Time of day 1222 and approximate location data 1224 are stored as part of the operation of the exemplary embodiment or values for these data may be received over a data link through communications transceiver 104. The writable memory 1202 further stores state variables in the status variables 1230 area, as are described below. For example, the determined status of each monitored environmental characteristic is stored in a state variable in the exemplary embodiment of the present invention.

The exemplary handheld communications device 130 further incorporates a temperature sensor 108 and a light sensor 110. The temperature sensor 108 determines the current ambient temperature in the area of the handheld communications device 130. The light sensor determines the ambient light levels in the area of the handheld communications device 130. The temperature and ambient light measurements made by these sensors are communicated to the controller 106, which utilizes them as is described below. The exemplary embodiment of the present invention utilizes analog-to-digital (A/D) conversion of data generated by the temperature sensor 108 and the light sensor 110 for input into the controller 106. Alternative embodiments use other interface methods, such as PWM-encoded digital output from the sensors that are provided to an input capture peripheral. The control and monitoring of the temperature sensor 108 and the light sensor 110 is performed under the control of the environmental monitor control program code 1210.

Embodiments of the present invention may contain other environmental monitors, such as humidity monitors or UV light sensors.

The GPS antenna 112 of the exemplary embodiment is used to receive GPS signals transmitted by orbiting GPS satellites. These signals are communicated at a relatively high radio frequency and do not typically penetrate buildings very well. The exemplary embodiments of the present invention utilize the poor building penetration characteristics of the GPS radio signals to assume that it is unlikely that GPS signals will be received when the handheld device 130, and its associated communications antenna 114 and GPS antenna 112, are located indoors. In the exemplary embodiment, the antennas are physically mounted on the handheld communications device 130 so that the entire apparatus is located either indoors or outdoors.

The exemplary embodiment of the present invention utilizes an "indoor/outdoor" algorithm to determine if the handheld communications device 130 is located either indoors or outdoors. In regards to operation of the exemplary embodiment of the present invention, indoors refers to an area where the receipt of GPS signals is unlikely and outdoors refers to an area where receipt of GPS signals is likely. The delineation of indoors and outdoors as used by the exemplary embodiment is made according to observed environmental characteristics, as is described herein. The exemplary embodiment of the present invention observes one or more of three parameters to determine if the handheld communications device 130 is located indoors or outdoors. Controller 106 of the exemplary embodiment includes a receive likelihood estimator that implements an algorithm to determine if the wireless signal receiver, i.e., the GPS receiver in the exemplary embodiment, is likely to receive a wirelessly transmitted signal, i.e., the GPS signals. The processing of the "indoor/outdoor" algorithm is performed according to program code contained in the receive likelihood estimator program code 1208.

The processing of the "indoor/outdoor" algorithm compares the observed parameters to expected data values based upon the handheld communications device's current geographic location, time of day and time of year. Alternative embodiments observe other or additional parameters in order to determine if the apparatus is indoors or outdoors. The exemplary embodiment observes ambient light levels, ambient temperature and Received Signal Strength Indicator (RSSI) data of a second wirelessly transmitted signal (i.e., the communications signal received by the communications transceiver 104 in the exemplary embodiment) to make the determination as to whether the handheld communications device 130 is indoors or outdoors. The exemplary embodiment of the present invention is able to receive expected data values for observed environmental characteristics from a meteorological data server that is in communications with the communications transceiver 104 via a wireless signal.

If the handheld communications device 130 is located outdoors, the processing of the receive likelihood estimator determines that the GPS receiver is likely to receive the GPS signals and activates the GPS receiver. If the handheld communications device 130 is determined to be indoors, the receive likelihood estimator of the exemplary embodiment determines that the GPS receiver is unlikely to receive the GPS signals and therefore inhibits or otherwise alters the operational mode or operating configuration of the GPS receiving function performed by the GPS receiver 102.

Figure 2:
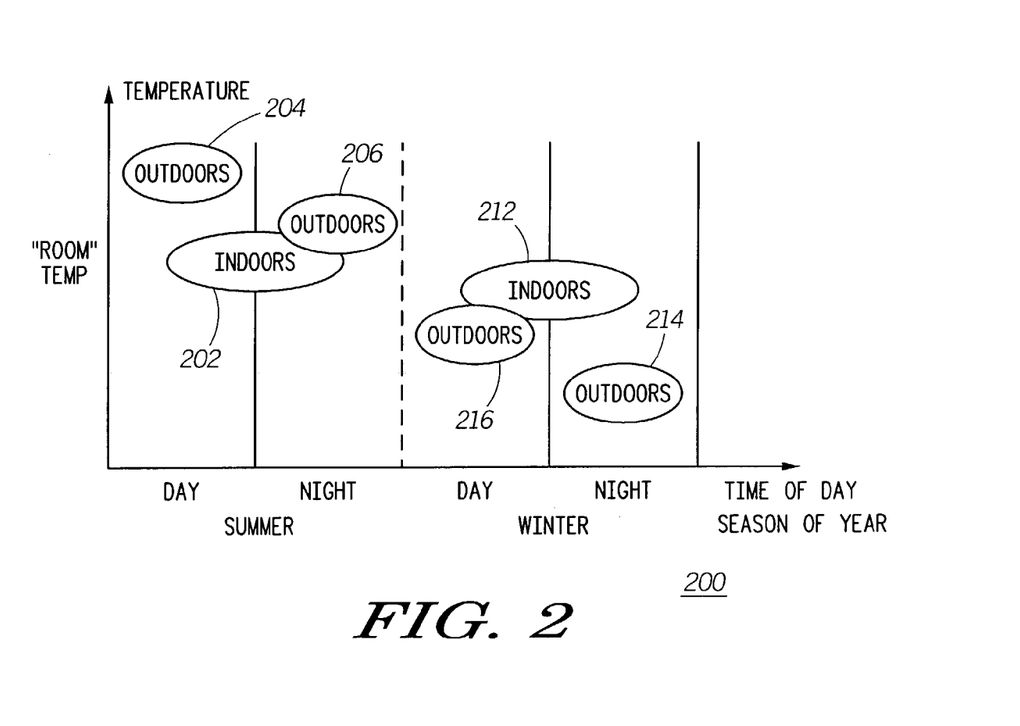
FIG. 2 is a graph showing expected ambient temperatures versus location and time of day.

An example of an expected ambient temperature graph 200 is illustrated in FIG. 2. The expected ambient temperature graph 200 illustrates the expected ambient temperature measurements that correlate to indoor and outdoor locations for different times of day and seasons of the year. The expected ambient temperature graph 200 represents the expected temperature measurements for a particular geographic location and consists of historical climactic data for the locale of the particular geographic location at certain times of the year. For example, geographic locations at different latitudes will have different expected ambient temperatures. These expected temperature readings for summer include daytime outdoors temperatures 204, nighttime outdoors temperatures 206 and the relatively constant indoor temperatures 202. The winter temperatures include the winter daytime outdoors temperatures 216, winter nighttime outdoors temperatures 214, and the winter indoors temperatures 212. The expected winter temperatures are shown to be lower than those in summer. This relationship among the outdoor temperatures is obvious, and the indoor temperatures also have this difference since heating and air conditioning temperatures are usually not set to the same values. The temperature value that is measured by the temperature sensor 108 in the exemplary embodiment is used as an input for determining whether the handheld device is indoors or outdoors, and therefore whether the GPS receiver is likely to receive the GPS signals.

Based upon the data in the expected ambient temperature graph 200, threshold values can be estimated that divide the expected temperature ranges that are observed at indoor locations and outdoor locations for different times of day and seasons of the year. In order to provide more reliable correlation between location and temperature observations, two thresholds can be estimated. A "warm" threshold is the upper temperature threshold that fairly clearly divides indoor and outdoor environments for a given time of day and season of year. A "cold" threshold is a similar threshold for the lower temperature that fairly clearly divides indoor and outdoor environment temperatures for a given time of day and season of year. Temperatures between these threshold values could indicate either an indoor or outdoor environment and therefore are considered to be an ambiguous reading for the processing of the exemplary embodiment. The exemplary embodiment stores these "warm" and "cold" thresholds for different times of day and times of year in the temperature table 1220 that is maintained by the controller 106. Embodiments of the present invention utilize only one temperature threshold to divide the expected temperature ranges between indoors and outdoors. The values that are stored in the temperature table 1220 of the exemplary embodiment are stored, according to geographic location, during the manufacture of the portable handheld device 130. The values of the temperature table 1220 are also able to be updated with values received by the communications transceiver 104 that originate from a meteorological server, such as a meteorological or other data server that is operated by the cellular telephone company serving the handheld device 130. Service personnel with programming equipment adapted to the particular handheld device 130 can also perform updates of the temperature table 1220. The temperature table in some embodiments of the present invention contains historical climactic data for different locations for one or more time of year.

Figure 3:
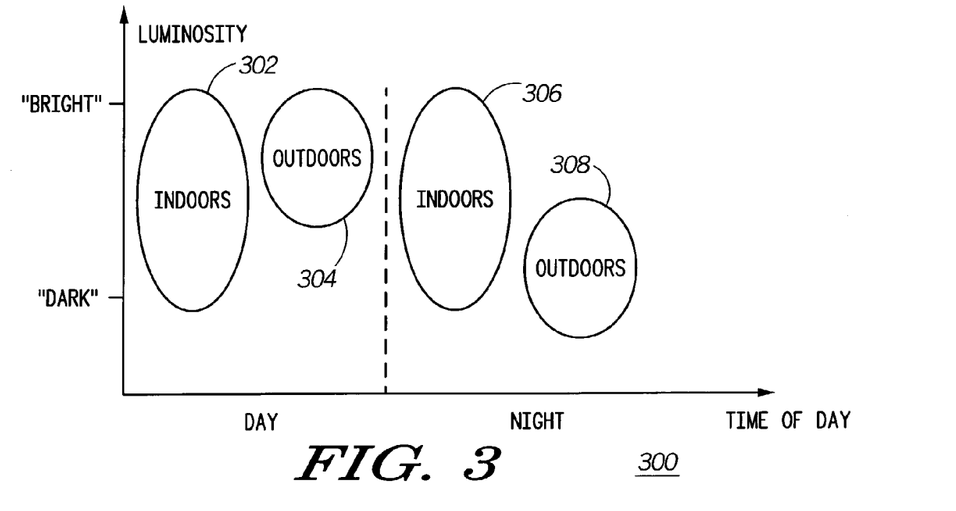
FIG. 3 is a graph showing expected luminosities versus location and time of day.

Expected luminosity levels 300 are illustrated in FIG. 3. Expected daytime indoors luminosity 302 and expected nighttime indoors luminosity 306 are shown to be substantially the same due to the artificial lighting conditions of indoor environments. The daytime outdoors luminosity levels 304 and nighttime outdoors luminosity levels 308 are shown to be different as is expected due to the presence and absence of sunlight. The expected period of daylight observations varies by the time of the year, so an expected luminosity level at early morning and late afternoon times is dependent upon the time of the year. The luminosity value that is measured by the light sensor 110 in the exemplary embodiment is used as in input for determining whether the handheld device is indoors or outdoors, and therefore whether the GPS receiver is likely to receive the GPS signals. Thresholds for expected luminosity are therefore dependent upon the time of day and time of year. Threshold values and their time of validity are stored in the luminosity table 1226 of the exemplary embodiment. The values that are stored in the luminosity table 1226 of the exemplary embodiment are stored during the manufacture of the portable handheld device 130. The values of the luminosity table 1226 are also able to be updated with values received by the communications transceiver 104 that originate from a data server, such as a data server operated by the cellular telephone company serving the handheld device 130. Updates of the luminosity table 1226 are also able to be performed by service personnel with programming equipment adapted to the particular handheld device 130.

Figure 4:
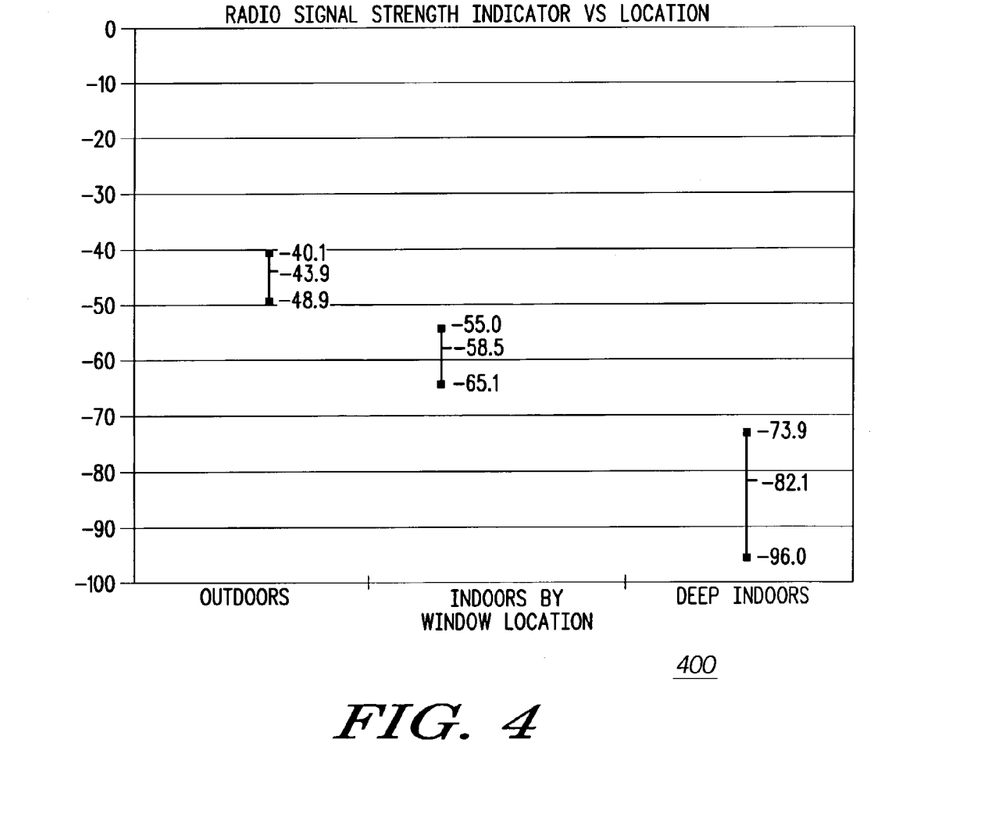
FIG. 4 is a graph showing expected Received Signal Strength Indicator (RSSI) versus location as utilized by an exemplary embodiment of the present invention.

In the exemplary embodiment of a portable communications receiver 130, the output of the received signal strength indicator (RSSI) for the communications signal received by the communications transceiver 104 of the handheld device 130 also vanes in a predictable manner between indoor and outdoor conditions. The expected RSSI values chart 400 illustrates the relative expected RSSI values for three locations, outdoors, indoors by a window, and deep indoors. The RSSI value that is measured by the communications transceiver 104 in the exemplary embodiment is used as an input for determining whether the handheld device is indoors or outdoors, and therefore whether the GPS receiver is likely to receive the GPS signals. The proximity, geometry and RF frequency of the communications signal make it likely that the communications transceiver 104 will receive a communications signal while the handheld device 130 is indoors, although the communications signal will probably be received at reduced power relative to outdoor reception. Although the communications signal is able to be received in an indoor environment, the distance, geometry and RF frequency of the GPS signal make it unlikely that the GPS signal can be received in an indoor environment. Thresholds for RSSI values are stored in the signal strength table 1228 in the exemplary embodiment. The expected RSSI values do not depend upon the time of day or time of year. The values that are stored in the RSSI table 1228 of the exemplary embodiment are stored during the manufacture of the portable handheld device 130. The values of the RSSI table 1228 are also able to be updated with values received by the communications transceiver 104 that originate from a data server, such as a data server operated by the cellular telephone company serving the handheld device 130. Updates of the RSSI table 1228 are also able to be performed by service personnel with programming equipment adapted to the particular handheld device 130.

Figure 5:
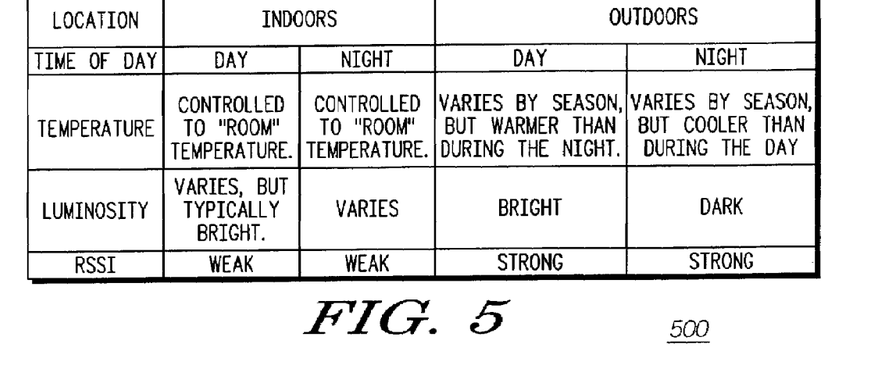
FIG. 5 is a table showing expected observed parameter correlations for different locations as may be utilized by an exemplary embodiment of the present invention.

An exemplary observed parameter correlation table 500 is illustrated in FIG. 5. The exemplary observed parameter correlation table 500 shows the expected values of the three quantities that are observed by the exemplary embodiment. The values of temperature, luminosity and RSSI that are expected to be observed indoors and outdoors for both day and night are illustrated. These three quantities allow a fairly accurate determination of whether the handheld device is indoors or outdoors. If the device is determined to be indoors, the exemplary embodiment places the GPS receiver into a low power or other improved operational mode. A preferred embodiment of the present invention places the GPS receiver in a completely power-off mode or a mode which powers down the RF receiver section of the GPS receiver so as to minimize power consumption. Preferred embodiments of the present invention are configured to operate the GPS receiver in a non-periodic manner when it is determined that the handheld device is indoors, wherein the non-periodic manner is not a random back-off. This non-periodic operation of the receiver in some embodiments when the handheld device is indoors has the GPS receiver cycle between fully operational modes and low-power modes. In this type of operation, the GPS receiver remains in the low-power mode for unequal time periods between periods of full operation. The time period in these embodiments for which the GPS receiver remains in the low-power mode is determined by an algorithm. The algorithm is chosen to produce one of deterministic, pseudo-random or random length time periods for low-power operation.

Figure 6:
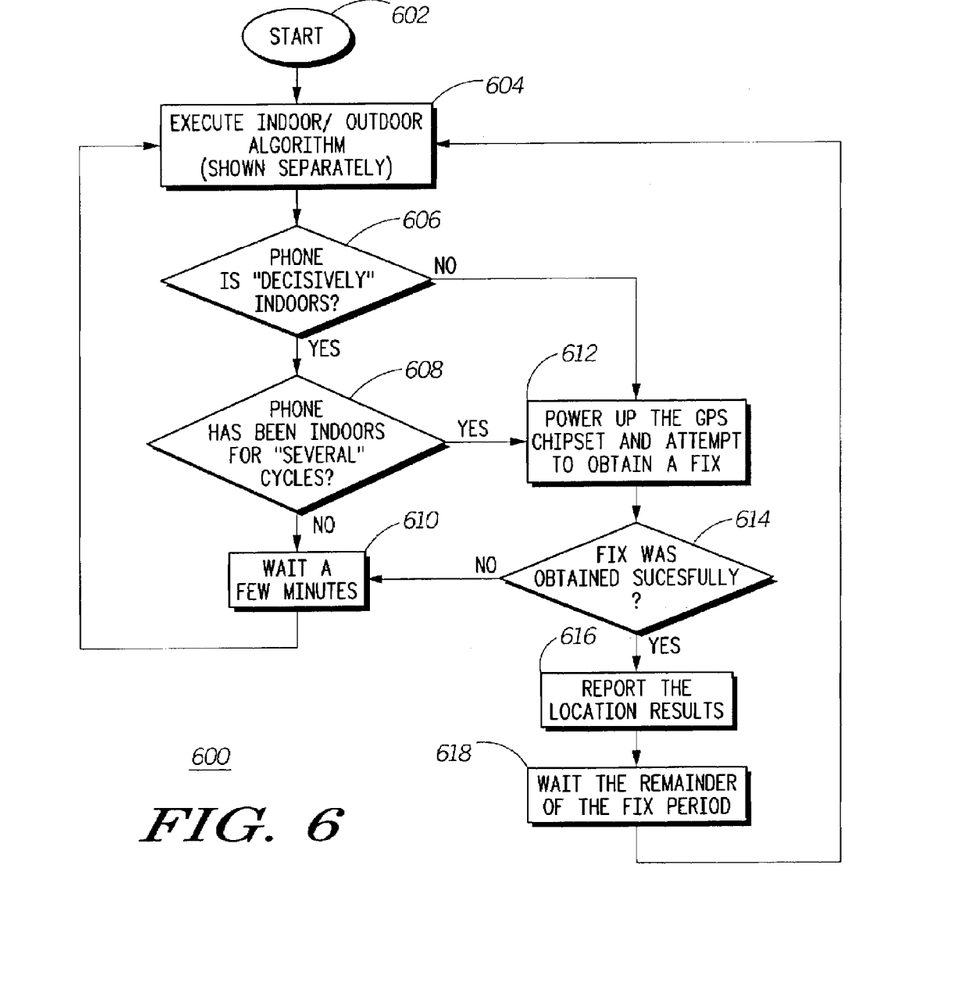
FIGS. 6 through 11 are processing flow diagrams that illustrate the processing performed, according to an exemplary embodiment of the present invention.

An exemplary top level processing flow 600 as is used by the exemplary embodiment of the present invention is illustrated in FIG. 6. The top level processing flow 600 starts, at step 602, and immediately advances to executing, at step 604, the indoor/outdoor algorithm. The indoor/outdoor algorithm of the exemplary embodiment is described below. Processing then continues by deciding, at step 606, if the exemplary cellular phone device containing the GPS receiver of the preferred embodiment is not decisively indoors. A decisive determination is made if the observed parameters, as illustrated in the exemplary observed parameter correlation table 500, indicate that the cell phone is indoors. If the cell phone is not decisively indoors, the GPS receiver 102 is then powered up, at step 612, and a GPS based fix is attempted. The GPS receiver 102 reports if a GPS fix was successfully obtained. It is then determined, at step 614, whether a GPS fix was successfully obtained. If a GPS fix is determined to have been successfully obtained, the location results of the fix are reported, at step 616. The processing then waits, at step 618, for the remainder of the period between GPS output by the GPS receiver 102.

If the cell phone was decisively determined to be indoors, the processing continues by determining, at step 608, if the cell phone has been indoors for several "cycles," which are iterations of the top level processing loop. If the cell phone is determined to have been indoors for several cycles, the receiver is powered up, in step 612, and processing continues as is described above. If the cell phone is rather determined to not have been indoors for several cycles, the processing continues by waiting, at step 610, for a few minutes prior to reiteration of the top level processing loop 600. After waiting, processing resumes, at step 604, by executing the indoor/outdoor algorithm and subsequent steps, as is described above.

If the above processing did determine that a GPS fix was successfully determined, at step 614, processing proceeds by waiting a few minutes, at step 610, prior to reiteration of the top level processing loop 600, as is described above.

Figure 7:
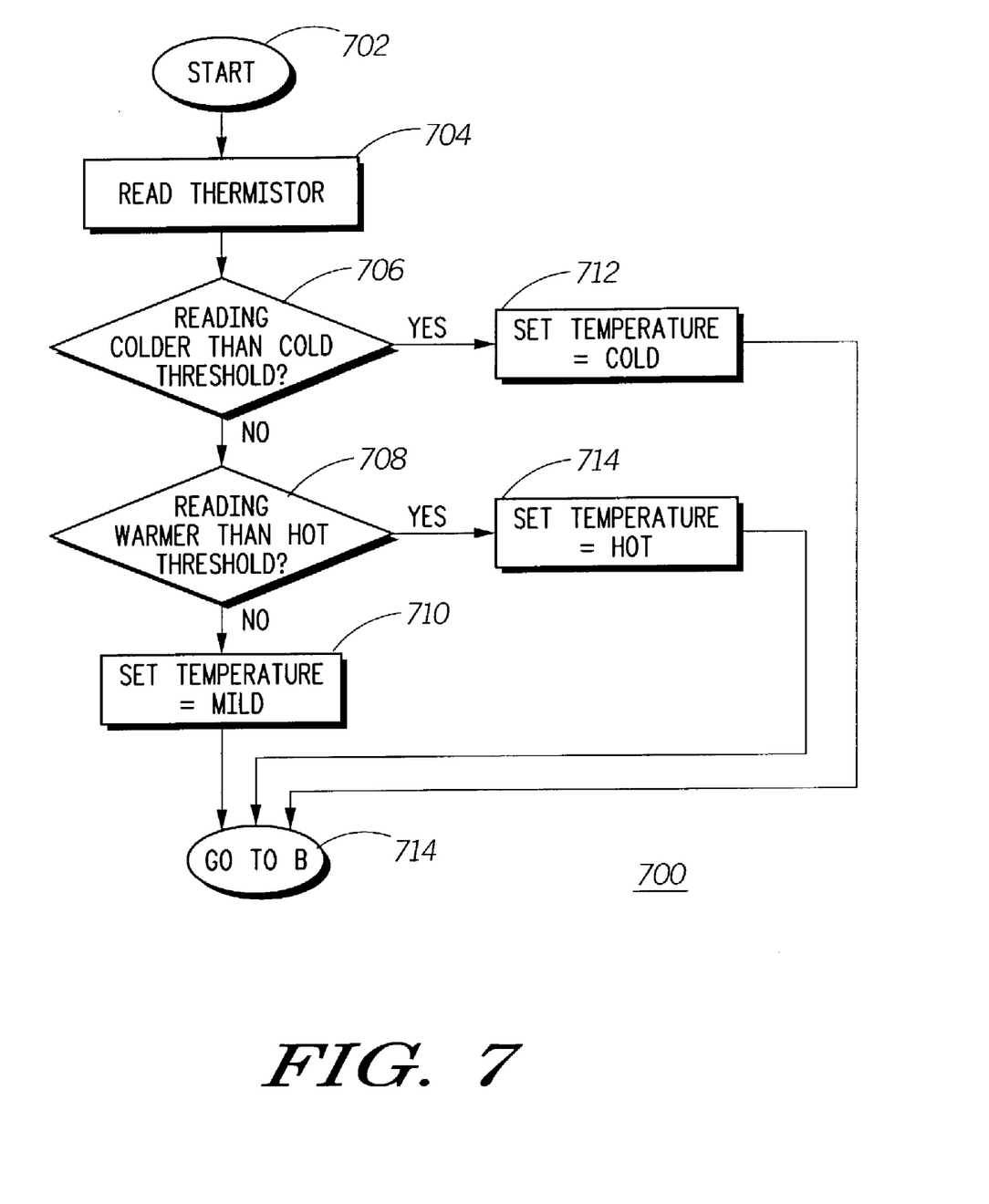

An exemplary indoor/outdoor algorithm processing flow 700 as is used by the exemplary embodiment of the present invention is illustrated in FIG. 7. The exemplary indoor/outdoor algorithm processing flow 700 starts, at step 702, and immediately proceeds to reading, at step 704, a temperature sensor 108. The temperature reading that is produced by the temperature sensor 108 is then analyzed to determine, at step 706, whether it is below the cold threshold for the time of day and time of year in which the determination is made. The relationship between expected temperatures as a function of time of day and time of year for indoor and outdoor environments is illustrated in the expected ambient temperature graph 200. If the temperature is determined to be below the cold threshold, the temperature is declared to be "cold" and that state is stored, at step 712, in a state variable within the controller 106 in the exemplary embodiment for use in further processing and processing continues as is described below.

If the temperature is not determined to be below the cold threshold, the processing continues by determining if the temperature, as read from the temperature sensor 108, is above the warm threshold for the time of day and time of year in which the determination is made. If the temperature is determined to be above the warm threshold, the temperature is declared as "hot" and that status is stored, at step 714, in a state variable of the controller 106 of the exemplary embodiment for use in further processing, as is described below.

If the temperature that is read from the temperature sensor 108 is neither above the hot threshold or below the cold threshold, the processing declares, at step 710, the temperature to be "mild" and that status is stored in a state variable of the controller 106 of the exemplary embodiment for use in further processing, as is described below.

Figure 8:
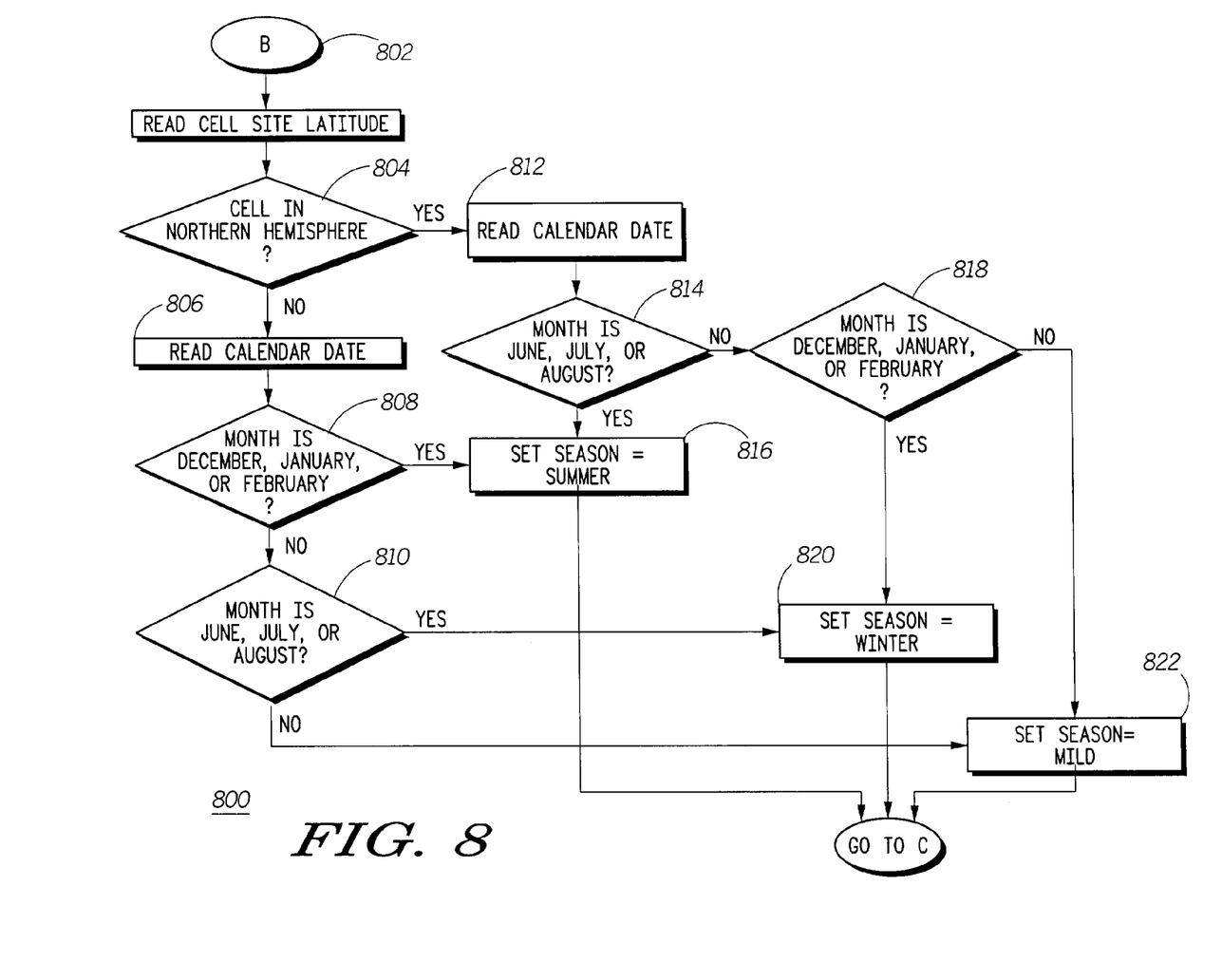

After the above processing declares the temperature to be either "hot," "cold," or "mild," and that status is stored in a state variable in the exemplary embodiment, the processing of the exemplary embodiment continues by determining the current season of the year. The processing of the exemplary embodiment begins this determination by reading, at step 802, the latitude of the cell site that is in communications with the communications transceiver 104. The communications transceiver 104 receives a data message from the transmission cell site that is communicating with the communications transceiver that specifies the latitude and longitude of that cell site. Embodiments of the present invention further transmit GPS ephemeris data or a reduced set of ephemeris data in a satellite almanac in order to allow the GPS receiver 102 to more rapidly acquire GPS satellite signals in a new location or after stored ephemeris data has been lost due to power interruption or other causes. The latitude is also able to be derived from previous GPS receiver 102 measurements.

After reading site latitude, the processing of the exemplary embodiment continues by determining, at step 804, if the cell site whose latitude has been received is in the northern hemisphere. If the latitude is determined to be in the northern hemisphere, the processing then reads, at step 812, the calendar date. The processing then determines, at step 814, if the current month is June, July or August. If the month is determined to be June, July or August, the processing sets, at step 816, the season to "summer." If the month is not June, July or August, the processing proceeds to determine, at step 818, whether the month is December, January or February. If the month is determined to be December, January or February, the season is set to be "winter." If this processing step determines that the month is not December, January, or February, the processing continues by setting the season to "mild." The exemplary embodiment stores the set value of the season in a state variable used by controller 106.

If the latitude is determined to be in the southern hemisphere, the processing then reads, at step 806, the calendar date. The processing then determines, at step 814, if the current month is December, January or February. If the month is determined to be December, January or February, the season is set, at step 816, to be "summer." If this processing step determines that the month is not December, January, or February, the processing determines, at step 810, if the current month is June, July or August. If the month is determined to be June, July or August, the processing sets, at step 820, the season to "winter." If the month is not June, July or August, the processing continues by setting the season to "mild." The exemplary embodiments store the set value of the season in a state variable used by controller 106.

Figure 9:
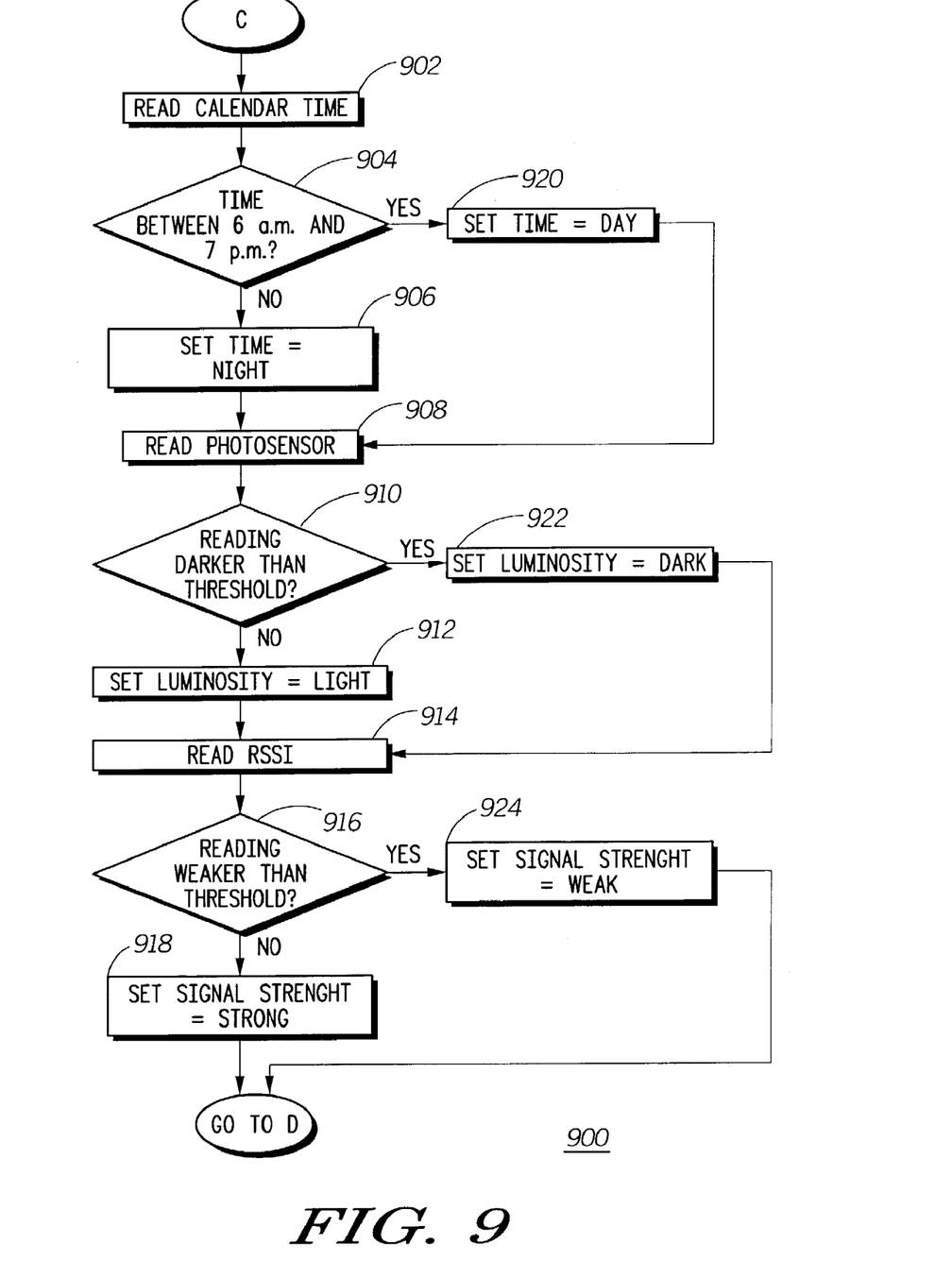

After the processing of the exemplary embodiment determines the season, as is described above, the processing continues by reading, at step 902, the time of day from the real time clock. The processing then determines, at step 904, whether the time is between 6 AM and 7 PM. In this example, 6 AM and 7 PM are the times of day that divide day and night for the particular day of the year. If the time is determined to be between 6 AM and 7 PM, the time of day value is set, at step 920, to "day." If the time is determined to not be between 6 AM and 7 PM, the time of day is set, at step 906, to "night." After the time of day is set to either "day" or "night," the processing of the exemplary embodiment then reads, at step 908, the luminosity as reported by the photosensor 110 that is part of the exemplary handheld device 100. After reading the luminosity reported by the photosensor 110, the processing of the exemplary embodiment then determines, at step 910, whether the light intensity of the reading is less than a threshold. The luminosity threshold in the exemplary embodiment is set so as to distinguish between expected luminosity levels between indoors and outdoors. If the luminosity reading is determined to be lower than the threshold, the processing of the exemplary embodiment sets the luminosity level to "dark." If the luminosity reported by the photosensor 110 is determined to not be less than the threshold, the luminosity level is set to "light." The luminosity level is stored in the exemplary embodiment in a state variable maintained by the controller 106.

Once the luminosity level is set, the processing of the exemplary embodiment continues by determining and characterizing the signal strength received by the communications transceiver 104. The Received Signal Strength Indicator (RSSI) output of the communications transceiver 104 is monitored by the controller 106 of the exemplary embodiment. The RSSI level is read, at step 914, and the processing of the exemplary embodiment determines, at step 916, whether the RSSI reading is less than the threshold. The RSSI threshold of the exemplary embodiment is set to an expected level that will discriminate between expected RSSI levels indoors and outdoors. If the RSSI reading is determined to be less than the threshold, the processing sets the signal strength level to "weak." If the RSSI reading is determined to not be less than the threshold, the processing sets the signal strength level to "strong." The signal strength level is stored in a state variable maintained by the controller 106 in the exemplary embodiment.

Figure 10:
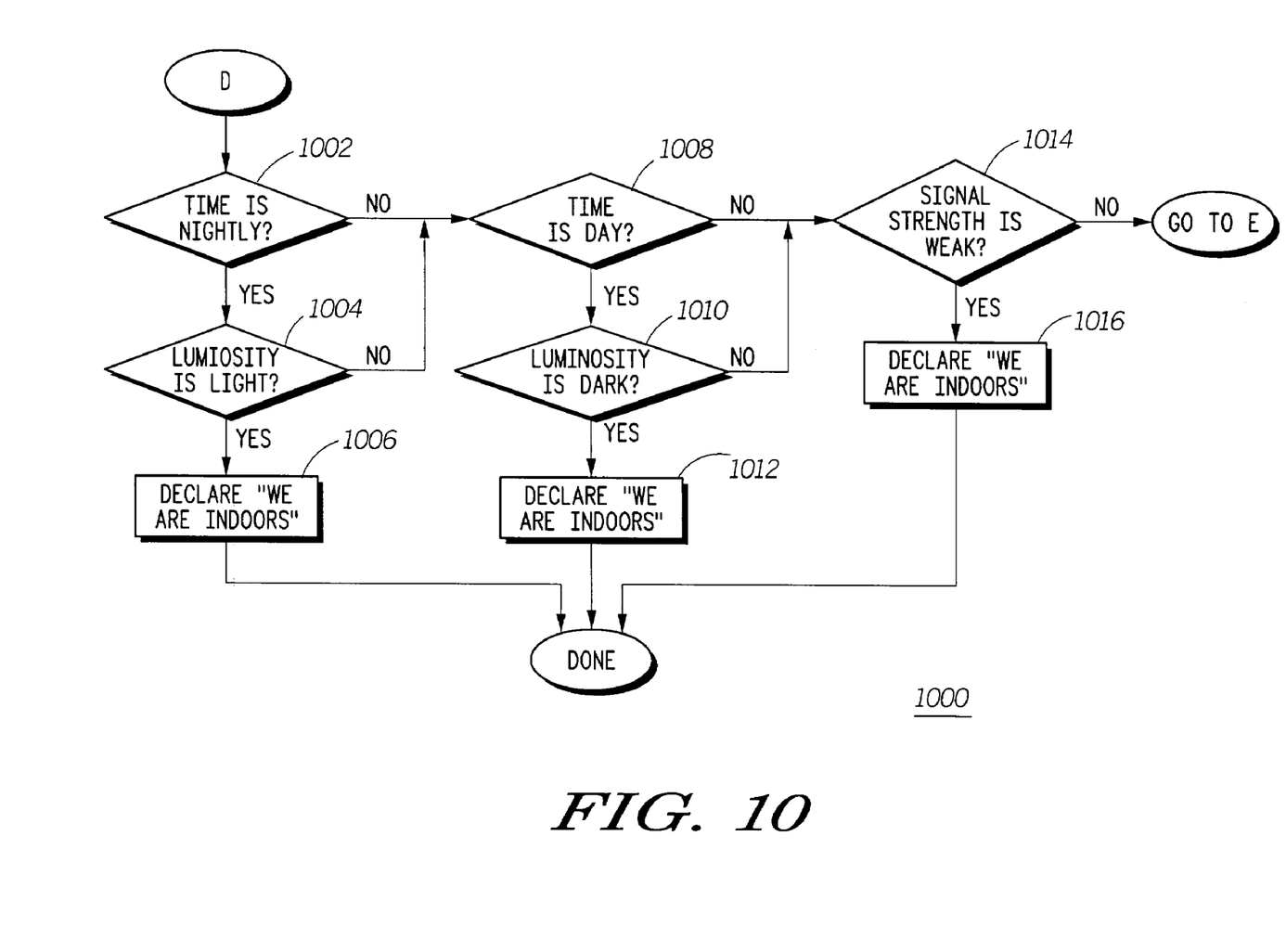

After setting the RSSI level, the processing of the exemplary embodiment determines, at step 1002, whether the time of day has been set to "night." If the time of day has been set to "night," the processing continues by determining, at step 1004, if the luminosity level has been set to "light." If the luminosity level has been set to light, the processing declares, at step 1006, that the handheld portable device of the exemplary embodiment is "indoors."

If the time of day was not set to be "night" or the luminosity was not set to "light," processing of the exemplary embodiment then determines, at step 1008, if the time of day was set to "day." If the time of day is set to "day," the processing of the exemplary embodiment then determines, at step 1010, if the luminosity is set to "dark." If the luminosity level is set to "dark," the processing then declares, at step 1012, that the handheld portable device is "indoors." If the latter two processing steps determined that the time of day was not set to "day" or that the luminosity level was not set to "dark," the processing of the exemplary embodiment continues by determining, at step 1014, whether the signal level was set to "weak." If the signal level was set to weak, the processing continues by declaring that the handheld portable device is "indoors."

Figure 11:
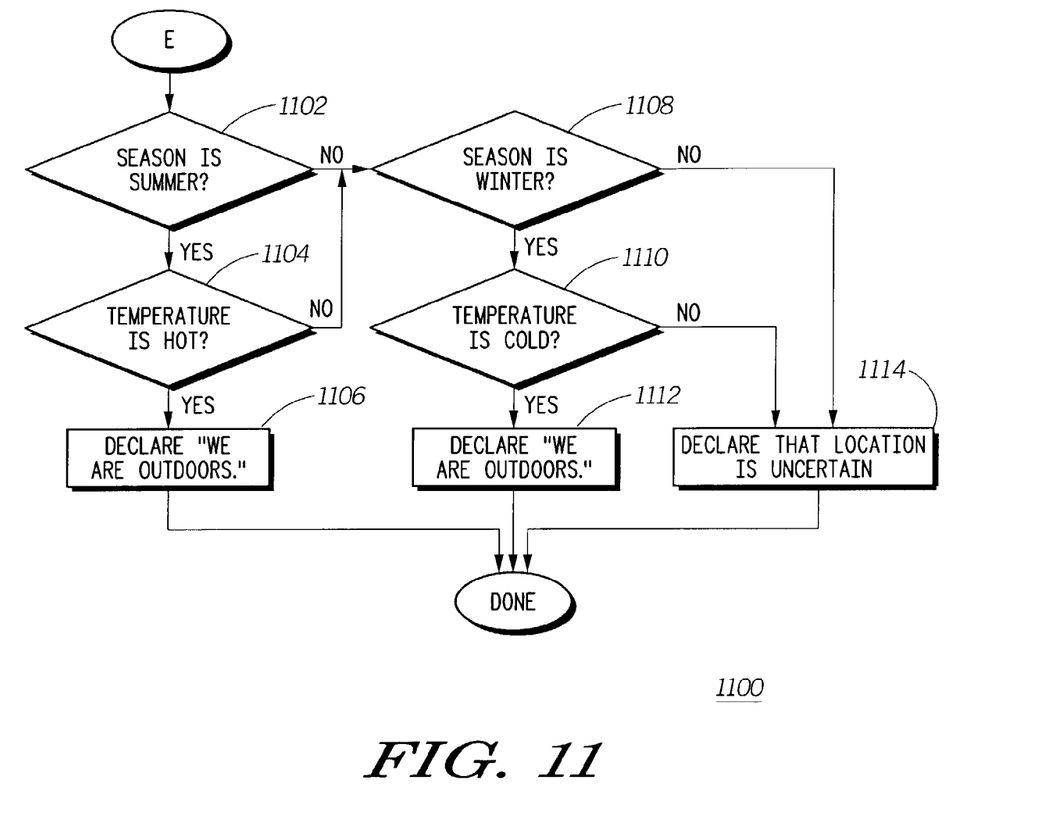

If the signal strength was not set to weak, the processing of the exemplary embodiment continues by determining, in step 1102, whether the season was set to "summer." If the season is set to "summer," the processing of the exemplary embodiment then determines, at step 1104, if the temperature has been set to "hot." If the temperature had been set to hot, the processing of the exemplary embodiment declares that the handheld portable device of the exemplary embodiment is outdoors. If the processing of the preceding two steps does not determine the season to be "summer" or the temperature to be "hot," the processing of the exemplary embodiment continues by determining, at step 1108, if the season has been set to "winter." If the season is set to "winter," the processing then determines, at step 1110, if the temperature is set to "cold." If the temperature is set to "cold," the processing then declares, at step 1112, that the handheld portable device of the exemplary embodiment is "outdoors." If the processing of the preceding two steps does not determine that the season is winter or that the temperature is cold, the processing then declares, at step 1114, that the handheld portable device is in an "uncertain" location. Once the handheld portable device of the exemplary embodiment is declared to be either "indoors," "outdoors," or "uncertain," that status is stored in a state variable maintained by the controller 106 for use in the higher level processing described above.

The processing described above is used to improve the operation of a device with a geo-location receiver by, according to a preferred embodiment, minimizing the operation of the geo-location receiver when there is a low likelihood of successful operation of the geo-positioning receiver. The exemplary embodiment allows a priority mode of operation that includes the operation of the geo-positioning receiver regardless of the determination of the likelihood of successful GPS receiver operation. An example of a priority mode is the use of a handheld communications device that is making an emergency call. A call to an emergency number, such as "911" in the United States, causes the controller 106 to enter into a priority mode that inhibits commanding an operational mode change of the GPS receiver. The present invention offers significant advantages over the prior art. For example, power drain by a GPS receiver is reduced by determining if GPS signals are likely to be received prior to operating the GPS receiver. Also, a reception operation of a GPS receiver is improved when the GPS receiver is operated when it is determined that reception of the GPS signal is likely. Other wireless signal receivers can benefit from this processing as well.

Although specific embodiments of the invention have been disclosed, it will be understood by those having ordinary skill in the art that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, comprising:
monitoring at least one environmental characteristic associated with a location of a wireless signal receiver;
determining if the wireless signal receiver is likely to receive a wirelessly transmitted signal at the location, wherein the determination is based at least in part upon the monitored at least one environmental characteristic associated with the location of the wireless signal receiver; and
improving the performance of the wireless signal receiver based upon determining if the wireless signal receiver is likely to receive a wirelessly transmitted signal
wherein the at least one environmental characteristic comprises at least one of ambient temperature, luminosity level, and a received signal strength of a second wirelessly transmitted signal;
wherein the determining uses the at least one environmental characteristic in conjunction with at least one of a temperature table, time of day, and an approximate location for the wireless signal receiver.

2. The method according to claim 1, wherein the wireless signal receiver determines its location.

3. The method according to claim 1, wherein the improving inhibits a receiving function of the wireless signal receiver.

4. The method according to claim 1, wherein the improving lowers the power consumption of the wireless signal receiver.

5. The method according to claim 1, wherein the wireless signal receiver is operated in a non-periodic manner after the determining determines that the wireless signal receiver is not likely to receive a wirelessly transmitted signal, wherein the non-periodic manner is not a random back-off.

6. The method according to claim 1, wherein the temperature table comprises historical climactic data for the location for one or more time of year.

7. The method according to claim 1, wherein the improving is inhibited when operating in a priority mode.

8. The method according to claim 7, wherein the priority mode is an emergency telephone call.

9. An apparatus, comprising:
a wireless signal receiver;
an environmental monitor for monitoring at least one environmental characteristic associated with a location of the wireless signal receiver;

a receive likelihood estimator, communicatively coupled to the environmental monitor, for determining if the wireless signal receiver is likely to receive a wirelessly transmitted signal at the location, wherein the determination is based at least in part upon the monitored at least one environmental characteristic associated with the location of the wireless signal receiver; and a receiver controller, communicatively coupled to the receive likelihood estimator and the wireless signal receiver, for commanding an operational mode change in the wireless signal receiver in response to a determination of whether the wireless signal receiver is likely to receive a wirelessly transmitted signal, wherein the operational mode change improves the performance of the wireless signal receiver;

wherein the operational mode change comprises operating the wireless signal receiver in a non-periodic manner, wherein the non-periodic manner is not a random back-off.

10. The apparatus according to claim 9, wherein the wireless signal receiver is a geo-positioning receiver.

11. The apparatus according to claim 9, wherein the operational mode change inhibits a receiving function of the wireless signal receiver.

12. The apparatus according to claim 9, wherein the operational mode change lowers the power consumption of the wireless signal receiver.

13. The apparatus according to claim 9, wherein the at least one environmental characteristic comprises at least one of ambient temperature, luminosity level, and a received signal strength of a second wirelessly transmitted signal.

14. The apparatus according to claim 9, wherein the receive likelihood estimator uses the at least one environmental characteristic in conjunction wit at least one of a temperature table, time of day, and an approximate location of the wireless signal receiver.

15. The method according to claim 14, wherein the temperature table comprises historical climactic data for the location for one or more time of year.

16. The apparatus according to claim 9, wherein the receiver controller does not command the operational mode change when operating in a priority mode.

17. The apparatus according to claim 9, wherein the priority mode is an emergency telephone call.

* * * * *